(12) United States Patent
Krauth (10) Patent No.: US 6,817,548 B2
(45) Date of Patent: Nov. 16, 2004

(54) FLUID DISTRIBUTION EMITTER AND SYSTEM

(75) Inventor: Richard G. Krauth, Fresno, CA (US)

(73) Assignee: R.M. Wade & Co., Tualatin, OR (US)

( * ) Notice: Subject to any disclaimer, the term of this patent is extended or adjusted under 35 U.S.C. 154(b) by 0 days.

(21) Appl. No.: 09/947,337

(22) Filed: Sep. 5, 2001

(65) Prior Publication Data

US 2003/0042335 A1 Mar. 6, 2003

(51) Int. Cl.[7] .............................................. B05B 15/00
(52) U.S. Cl. .................... 239/542; 239/547; 239/533.1
(58) Field of Search ................................ 239/542, 547, 239/104, 106, 107, 533.1, 533.13, 566, 567; 138/40–46; 405/36, 42, 49; 285/13, 14

(56) References Cited

U.S. PATENT DOCUMENTS

| | | | |
|---|---|---|---|
| 3,792,588 A | * | 2/1974 | Gilaad ........................ 285/14 |
| 4,060,200 A | | 11/1977 | Mehoudar |
| 4,210,287 A | | 7/1980 | Mehoudar |
| 4,215,822 A | | 8/1980 | Mehoudar |
| 4,307,841 A | | 12/1981 | Mehoudar et al. |
| 4,366,926 A | | 1/1983 | Mehoudar |
| 4,413,786 A | | 11/1983 | Mehoudar |
| 4,573,640 A | | 3/1986 | Mehoudar |
| 4,655,397 A | * | 4/1987 | Gorney ........................ 239/542 |
| 4,718,608 A | | 1/1988 | Mehoudar |
| 4,960,584 A | * | 10/1990 | Brown ........................ 239/542 |
| 5,022,940 A | | 6/1991 | Mehoudar |
| 5,111,996 A | * | 5/1992 | Eckstein ..................... 239/542 |
| 5,122,044 A | | 6/1992 | Mehoudar |
| 5,207,386 A | | 5/1993 | Mehoudar |
| 5,324,371 A | | 6/1994 | Mehoudar |
| 5,829,685 A | * | 11/1998 | Cohen ........................ 239/542 |

FOREIGN PATENT DOCUMENTS

WO     WO 89/09539     * 10/1989

OTHER PUBLICATIONS

One (1) Drawing of Hardie Company's emitter. See Exhibit A to the accompanying Declaration of Richard G. Krauth dated Apr. 28, 2004.

Four (4) Drawings of the Wade Line emitter. See Declaration of Steven Brunnengraeber, submitted with Apr. 20, 2004 Supplemental Response to Office action.

* cited by examiner

*Primary Examiner*—Dinh Q. Nguyen
(74) *Attorney, Agent, or Firm*—Kolisch Hartwell, P.C.

(57) ABSTRACT

In accordance with an embodiment of the invention, an inline fluid distribution emitter includes a hollow cylindrical body with a flow-rate control path formed on the cylindrical body. The flow-rate control path extends over an axial length of the cylindrical body and at least seventy percent of the circumference the surface of the cylindrical body.

29 Claims, 6 Drawing Sheets

FLUID DISTRIBUTION EMITTER AND SYSTEM

FIELD OF THE INVENTION

The present invention relates to fluid distribution emitters in which the emitters are installed inside fluid distribution tubing.

BACKGROUND OF THE INVENTION

Drip or flow-rate controlled leaching systems have various mining applications. Drip irrigation systems or flow-rate controlled irrigation systems have many uses in agriculture or landscape applications. The present invention is usable in mining, agriculture and landscape industries. In each setting, it is desirable to control the amount of fluid, such as water, that flows through such a system over a given period of time is typically desired. In this regard, various flow-rate control devices may be employed. Flow-rates are typically measured in liquid volume per unit of time, such as gallons per hour (gph).

Historically, such flow-rate devices may be susceptible to plugging due to many factors, such as the presence of a variety of particulates in the fluid being distributed. This can be caused by leaching chemicals precipitating out of fluid being distributed, scale build up due to water hardness, introduction of carbon used in treatment processes into the drip lines and the entry of dirt and other debris as a result of drip lines being dragged. Such particulates may also result from sediment in an irrigation water source or contamination of the irrigation water source. Typically, emitters designed to achieve lower flow-rates are more susceptible to such plugging. In both mining and agricultural settings, the lower the pressure, the lower the flow-rate will be, and the more susceptible the system will be to plugging. Plugging can also occur as a result of pressure fluctuations and changes in elevation.

While employing filters to remove contaminants in irrigation systems may reduce the frequency of plugging in flow-rate control devices, such filters are typically expensive, and their use may be cost prohibitive in certain applications. Moreover, filtration systems cannot be included at enough spots along the lines to prevent blockages. Therefore, alternatives to conventional flow-rate control devices are desirable.

SUMMARY OF THE INVENTION

In accordance with an embodiment of the invention, a fluid distribution emitter installed inside tubing is provided. The emitter includes a hollow cylindrical body with a flow-rate control path formed on the cylindrical body. The flow-rate control path extends over an axial length of the cylindrical body and at least seventy percent of the circumference of the surface of the cylindrical body.

BRIEF DESCRIPTION OF THE DRAWINGS

The subject matter regarded as the invention is particularly pointed out and distinctly claimed in the claims. The invention, however, both as to organization and method of operation, together with features and advantages thereof, may best be understood by reference to the following detailed description when read with the accompanying drawings in which:

DETAILED DESCRIPTION OF THE PREFERRED EMBODIMENTS

Prior Art Inline Emitter

Figure 1:
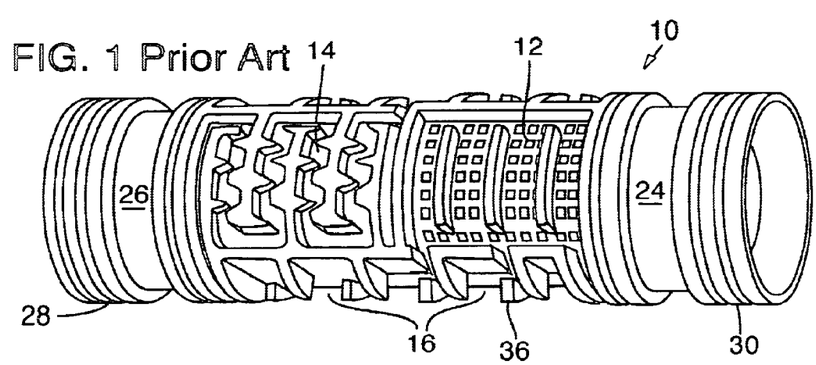
FIG. 1 is an isometric view of a prior art inline irrigation emitter.
Figure 2:
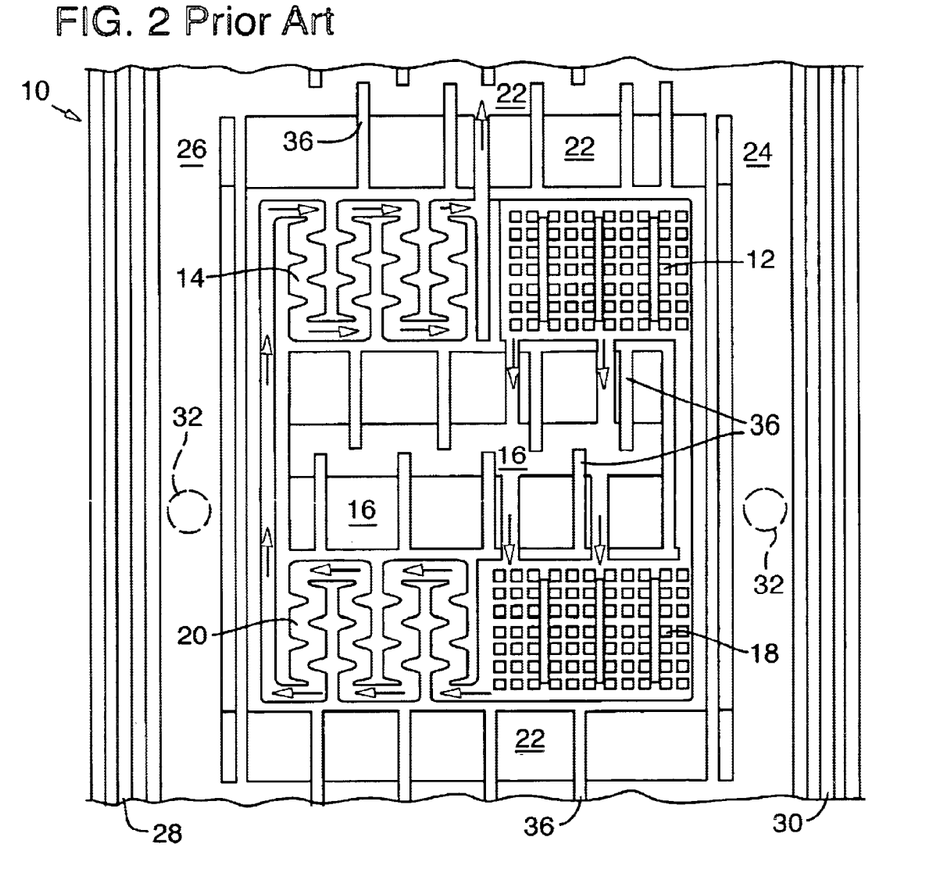
FIG. 2 is a schematic, fragmentary, two-dimensional representation of the surface configuration of the emitter illustrated in FIG. 1.

As indicated above, flow-rate control devices for drip irrigation systems may, for example, be susceptible to plugging, especially at lower flow-rates. Such "lower" flow-rates may be on the order of one-half to one-quarter gallon per hour (gph). In this regard, FIGS. 1 and 2 illustrate a prior art flow-rate control device, specifically a fluid distribution emitter that is positioned inside of distribution tubing. This emitter may be susceptible to plugging at such lower flow-rates due its design configuration. Such emitters are sometimes referred to as inline emitters, but that term is also used sometimes to describe an emitter that has its two ends positioned within two spaced pieces of tubing to interconnect the tubing and to facilitate fluid distribution from a point between the adjacent ends. The term "inline emitter" as used herein is not making reference to such an emitter, but is only making reference to an emitter that is positioned entirely within one (or possibly two abutting) piece (s) of tubing. Because these types of inline emitters include labyrinth flow paths, they are also sometimes referred to as "emitters."

Referring to FIG. 1, a prior art inline irrigation emitter is shown generally at 10. In use, such an emitter would typically be inserted inside an appropriately sized tubing or pipe, as will be discussed in more detail hereinafter. These types of emitters are generally cylindrical in shape and may be molded of high-density polyethylene using a two die molding process. The center of emitter 10 would typically be hollow to allow fluid, typically water under pressure, to flow into the body of the emitter. For the purposes of this disclosure, fluid in such a system will sometimes be referred to as water for sake of consistency, though the invention is, of course, not limited to water distribution.

As can be seen in FIG. 1, prior art emitter 10 includes a number of surface features that are formed as part of the molding process. These features are also shown in FIG. 2 and will be discussed with respect to that drawing. FIG. 2 illustrates a two-dimensional representation of the surface configuration of emitter 10. In this drawing, the cylindrical body has been split, rolled out, and is depicted in a planar view.

Emitter 10 includes two annular sealing portions 28 and 30 at the distal ends of the emitter 10. Annular sealing portions 28 and 30 typically effect fluid-tight seals when emitter 10 is inserted in, or disposed within, an appropriately sized emitter pipe. Such seals result in water in the emitter pipe flowing into and through the hollow body of emitter 10. The water would then, in turn, flow through screen areas 12 and 18 and fill reservoir 16. Emitter 10 also includes a number of raised portions, indicated at 36, which define the water flow path. Raised portions 36 also typically effect fluid-tight seals with an emitter pipe.

As shown by arrows in FIG. 2, water conveyed through screens areas 12 and 18 then flows into a first labyrinth flow-rate control path section 20, and then subsequently to a second labyrinth flow-rate control path section 14. The water then flows into exit path 22 and, in turn, to exit flow areas 24 and 26. Thus, while the water takes a single flow path through prior art emitter 10, it can flow into either of the two exit flow areas 24 or 26. Dashed lines in FIG. 2 indicate where orifices 32 may be formed in an emitter pipe (not shown) to convey water from emitter 10 externally through the emitter pipe. Depending on the particular application, a single orifice 32 may be employed, or multiple orifices may be used, as depicted in FIG. 2.

As can be seen in FIG. 2, the labyrinth flow-rate control path sections 14 and 20 cover approximately fifty percent of the circumference of emitter 10 and approximately fifty percent of the axial length of emitter 10 between exit flow area 24 and exit flow area 26. This configuration is due, at least in part, to limitations of the two die molding process typically employed in manufacturing such emitters.

The flow-rate associated with inline emitters depends on the hydraulic resistance of the flow-rate control path. In this regard, the depth, width and length of such a flow-rate control path affect the flow-rate for such emitters. Typically, the length and depth of the flow-rate control path are fixed. The length is dependent on the surface area of the emitter employed for forming the flow-rate control path, while the molding process employed in manufacturing such emitters typically limits the available surface area. In this regard, the width of the flow path is typically the dimension that is varied to control flow-rate in such emitters. To produce lower flow-rates, the path would typically be narrowed, which increases hydraulic resistance and, as a result, reduces flow-rate. However, such narrowing of the flow-rate control path may increase the likelihood that such an emitter will plug, as particulates in the water will be more likely to build up in the flow-rate control path. For example, emitter 10, if designed for a one-quarter gallon per hour flow-rate, in certain applications, may plug within one hour of use. Once it is plugged, because there is only one fluid path through emitter 10, the emitter is rendered useless and must be replaced. Therefore, alternative approaches for inline emitters with reduced susceptibility to plugging are desired. It is also desirable to develop a system for dealing with a plugged emitter that does not require replacement.

Another form of prior art inline emitter is similar to emitter 10 except that it includes two flow paths. This emitter is called the Drip In and is marketed by Toro. However, like emitter 10, the two labyrinth flow control paths of the Drip In prior art emitter cumulatively cover no more than about fifty percent of the circumference of the emitter and about fifty percent of the axial length of the emitter between its two exit flow areas.

First Embodiment of the Invention

Figure 3:
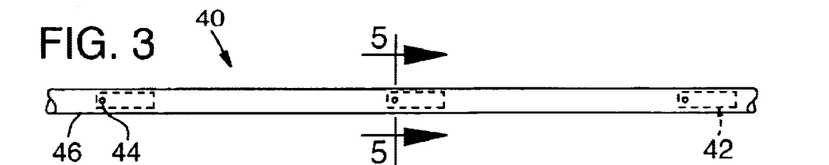
FIG. 3 is a schematic drawing showing a plurality of emitters disposed within an emitter pipe in accordance with one embodiment of the invention.
Figure 4:
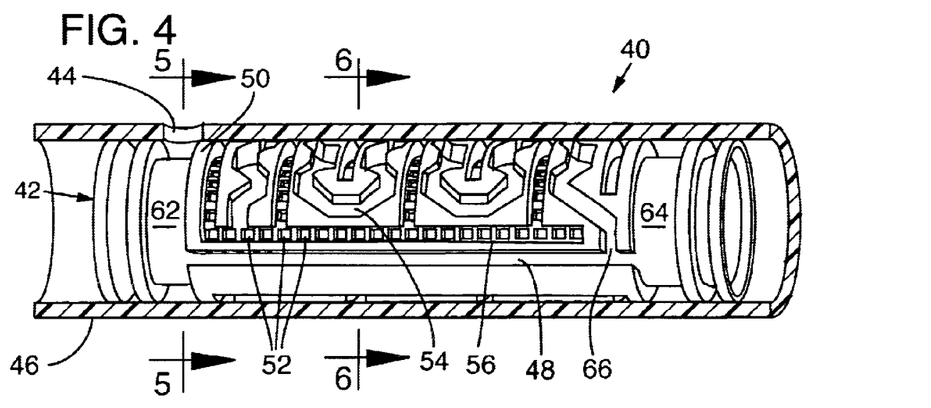
FIG. 4 is a side elevation view of a portion of the irrigation system depicted in FIG. 3, showing the emitter pipe in section.

FIGS. 3–11 depict a first embodiment of the present invention. FIG. 3 is a schematic drawing illustrating a portion of a simplified fluid distribution system 40. System 40 includes plural inline emitters 42 positioned within an emitter pipe 46, with orifices 44 in the emitter pipe. Such orifices would typically correspond with exit flow area of inline emitters 42, to be described below. FIG. 4 is an enlarged and more detailed drawing of a single emitter 42 disposed in a cut-away section of pipe 46. As can be seen in FIG. 4, emitter 42 includes a number of surface features that are formed as part of the molding process. These features are also shown in FIGS. 5–11, and will be discussed in detail with respect to those drawings.

Figure 5:
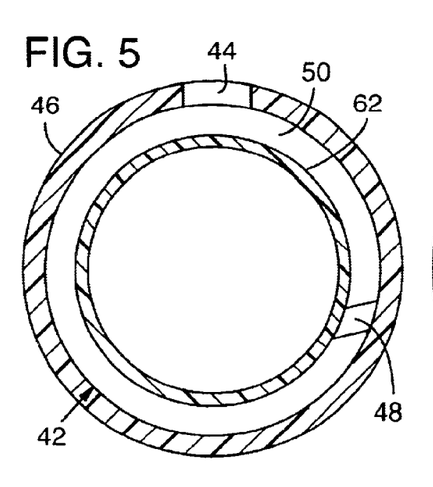
FIG. 5 is an end elevation sectional view taken along line 5—5 in FIGS. 3 and 4.

FIG. 5 is an end elevation, sectional view of emitter 42 and emitter pipe 46 taken along line 5—5 of FIGS. 3 and 4. While emitter pipe 46 is depicted as cut away in FIG. 4, the sectional view shown in FIG. 5 illustrates emitter pipe 46 intact. Orifice 44, which is formed in emitter pipe 46, corresponds with exit flow area 62 of emitter 42, and permits fluid to flow from the emitter and through the emitter pipe. Raised portion 50, which, in part, defines exit flow area 62, forms a fluid-tight seal with emitter pipe 46 so that fluid in emitter pipe 46 will flow within emitter 42 through a flow-control path 54 rather than between the outer surface of the emitter and the inner wall of emitter pipe 46. Exit flow path 48 is also depicted in FIG. 5, and will be discussed in further detail hereafter.

Figure 6:
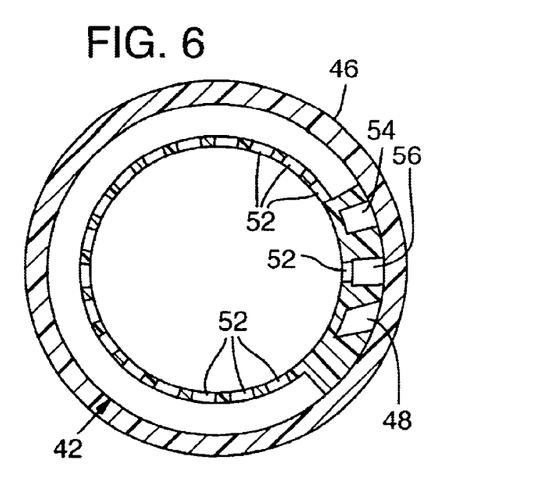
FIG. 6 is an end elevation sectional view taken along line 6—6 in FIG. 4.
Figure 7:
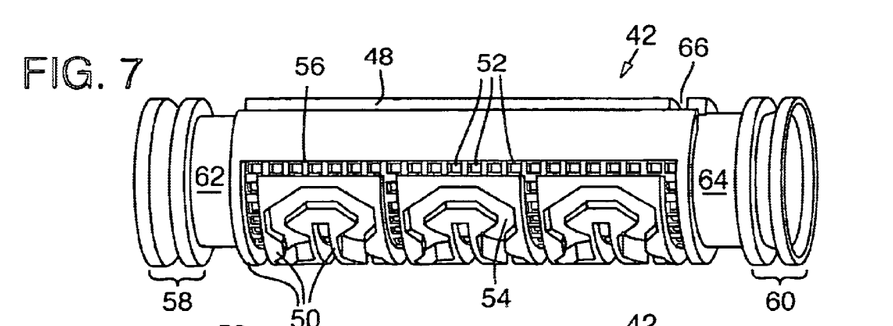
FIG. 7 is an isometric view of an inline emitter in accordance with an embodiment of the invention.
Figure 8:
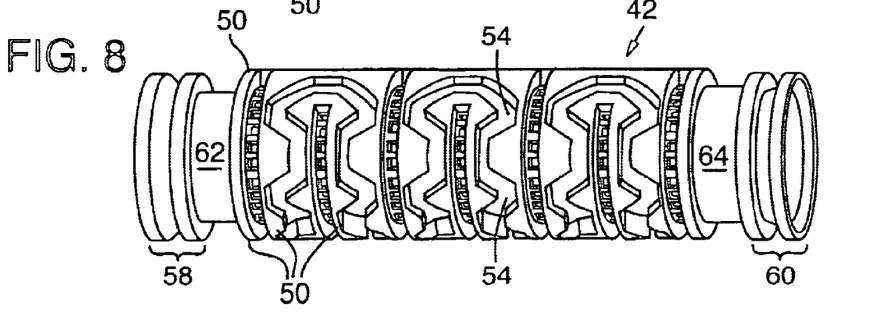
FIG. 8 is an isometric view corresponding to FIG. 7 except that the emitter has been rotated ninety degrees from the position of FIG. 7.
Figure 9:
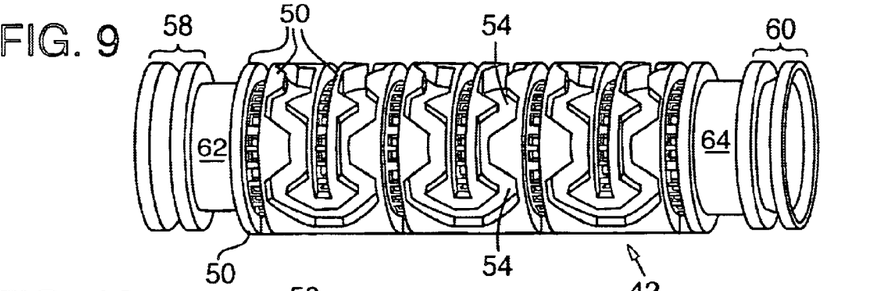
FIG. 9 is an isometric view corresponding to FIGS. 7 and 8 except that the emitter has been rotated ninety degrees from the position of FIG. 8.
Figure 10:
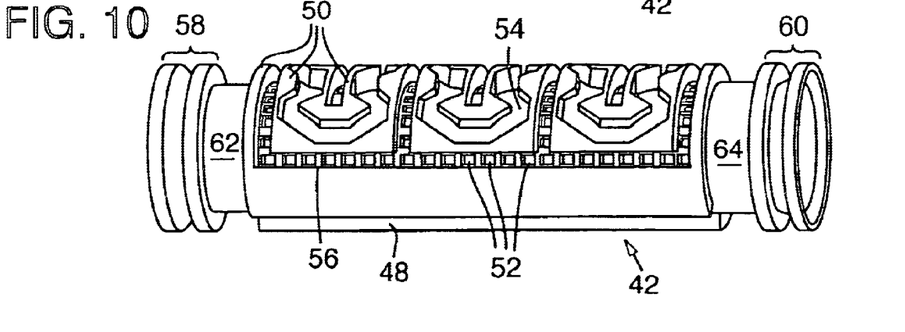
FIG. 10 is an isometric view corresponding to FIGS. 7, 8 and 9 except that the emitter has been rotated ninety degrees from the position of FIG. 9.

FIG. 6 is an end elevation sectional view of emitter 42 and emitter pipe 46 along line 6—6 of FIG. 4. While emitter pipe 46 is depicted as being cut away in FIG. 4, the sectional view shown in FIG. 6 illustrates emitter pipe 46 intact. The cylindrical body of emitter 42 contains a mesh arrangement 56, where the mesh arrangement may include screen holes, indicated at 52. In this sectional view, flow-rate control path 54, mesh arrangement 56 and exit flow path 48 are shown. Examination of the sectional view depicted in FIG. 6 in conjunction with FIGS. 4 and 7–11 illustrates the relationship of these surface elements of emitter 42.

Figure 11:
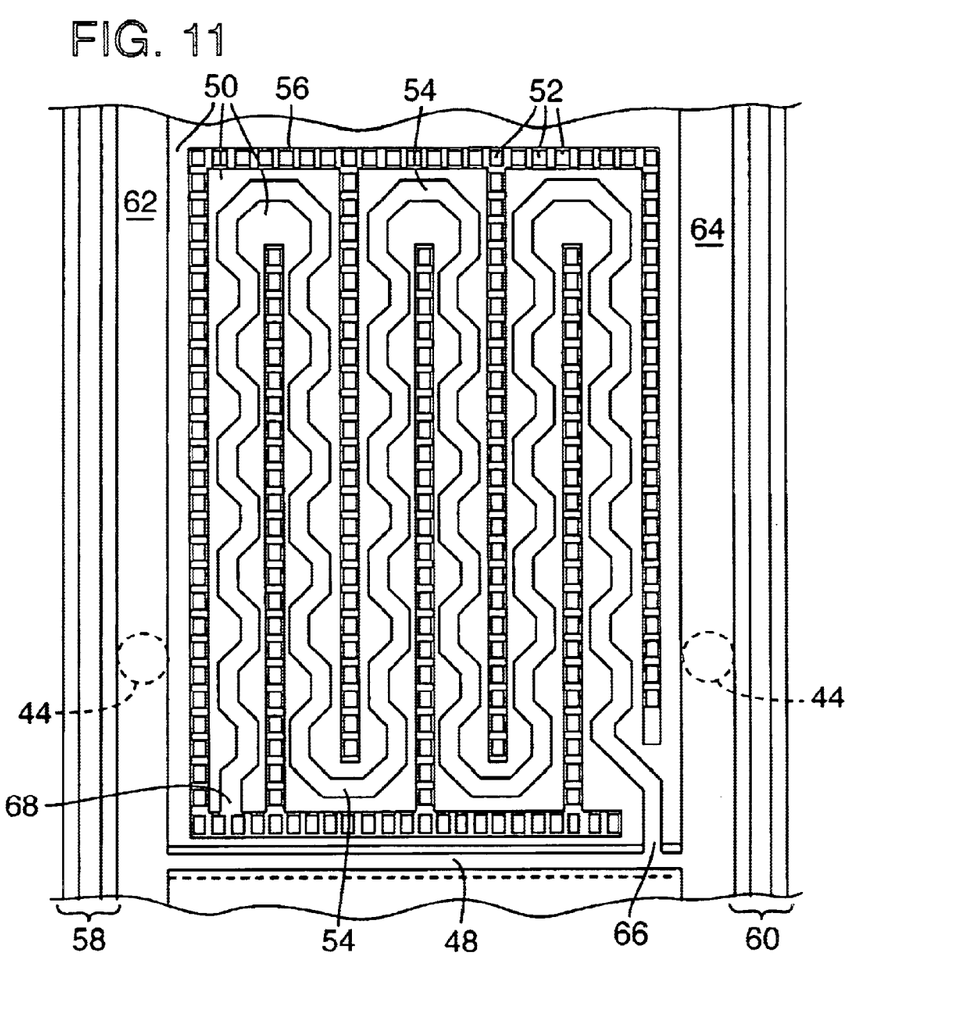
FIG. 11 is a schematic, fragmentary, two-dimensional representation of the surface configuration of the emitter illustrated in FIGS. 7–10.

Specifically, FIGS. 7, 8, 9 and 10 depict, respectively, isometric views of emitter 42 rotated by ninety-degree increments. Each of these views show flow-rate control path 54 being defined by raised portion 50. The surface features of emitter 42 illustrated in FIGS. 7–10 are also shown in FIG. 11, which is a two-dimensional representation of the surface configuration of emitter 42. In FIG. 11, the cylindrical body is depicted as having been split, rolled out, and is shown in a planar view. Emitter 42 includes two annular sealing portions 58 and 60, as have been previously discussed. These sealing portions typically effect a fluid-tight seal with an emitter pipe, such as emitter pipe 46. Adjacent to annular sealing portions 58 and 60, emitter 42 includes exit flow areas 62 and 64. Shown in dotted lines, typical locations for orifices 44 in an emitter pipe, such as emitter pipe 46, are shown. Raised portions 50 define the boundaries of flow-rate control path 54 and mesh arrangement 56, as well as exit flow path 48.

As shown in FIG. 11, flow-rate control path 54 includes an inlet 68 that is hydraulically coupled to the hollow center of emitter 42 via mesh arrangement 56 having screen holes 52. Flow-rate control path 54 also includes outlet 66, which is hydraulically coupled to exit flow path 48. Exit flow path 48 extends between first exit flow area 62 and second exit flow area 64. Therefore, each end of exit flow path 48 might be referred to as a first and second outlet, respectively. Mesh arrangement 56 is comprised of a plurality of rows of screen holes 52. Two of these rows, extending vertically at the left and right side of FIG. 11, might be referred to as first and second inlets, defining first and second flow paths, both of which lead to inlet 68. Fluid within emitter 42 is conveyed to inlet 68 via mesh arrangement 56 and screen holes 52. The fluid then flows through flow-rate control path 54 to outlet 66. Then, in turn, the fluid flows to exit flow areas 62 and 64 via exit flow path 48 and is conveyed out of the emitter pipe via orifice(s) 44.

In the depicted embodiment, the labyrinth or back and forth configuration of flow-control path 54 can be seen. Alternatively, this configuration might be described as reciprocating from side to side or axially as emitter 42 is positioned within emitter pipe 42. In the depicted labyrinth configuration, flow-control path 54 also might be said to reciprocate in long loops in a circumferential direction.

In the depicted embodiment, mesh arrangement 56 and flow-rate control path 54 are interspersed and disposed axially between exit flow areas 62 and 64. The interspersed mesh arrangement and flow-rate control path cover over ninety percent of the circumference of emitter 42. Therefore, flow-rate control path 54 may be considerably longer, forty percent or more, than flow-rate control paths of previous emitters, such as prior art emitter 10 shown in FIGS. 1 and 2. In this regard, a wider flow-rate control path may be employed to achieve a similar flow-rate as previous emitters having much narrower control paths. For example, emitter 42 may have a flow-rate control path two or more times the width of emitter 10, while achieving a comparable flow rate. This is advantageous because, as was previously indicated, having a wider flow path may reduce the susceptibility of emitter 42 to plugging. Further, because the flow-rate control path of emitter 42 is typically longer than prior emitters, emitter 42 will normally be less susceptible to water pressure variations. This is due, at least in part, to the distribution of hydraulic resistance over a longer flow-rate control path.

In manufacturing such emitters, previous manufacturing limitations may be overcome by employing an improved tooling scheme, such as using a four part die set to mold, for example, emitter 42 of high-density polyethylene. Thus, emitter 42 may be said to have four even-sized quadrants. It can be seen that flow control path 54 enters each of these four quadrants.

Second Embodiment of the Invention

Figure 12:
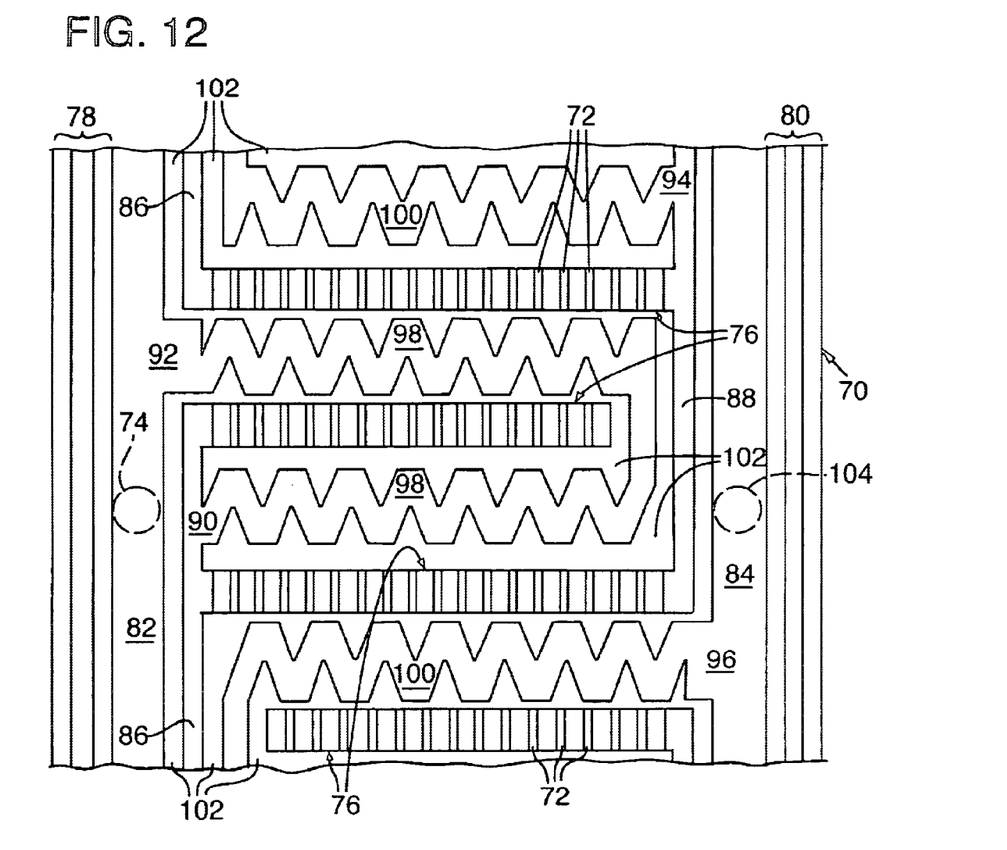
FIG. 12 is a schematic, fragmentary, two-dimensional representation of the surface configuration of a second embodiment of the present invention, this embodiment having two flow-rate control paths.

FIG. 12 depicts the surface configuration of an inline emitter 70 in accordance with an alternative embodiment of the invention. In this drawing, the cylindrical body of emitter 70 is depicted as having been split, rolled out and is shown in a planar view. Emitter 70 includes annular sealing portions 78 and 80 and exit flow areas 82 and 84, as have been previously discussed with respect to emitter 42. Typical locations of orifices 74 and 104 are also indicated. Emitter 70 also includes raised portions 102 that form the surface features of emitter 70.

Emitter 70, in contrast with emitter 42, however, has two discrete flow-rate control paths 98 and 100. In this respect, first flow-rate control path 98 includes inlet 90 and outlet 92. Inlet 90 is hydraulically coupled with the interior of emitter 70 via mesh arrangement 76 and inlet flow path 86. Mesh arrangement 76 includes screen holes 72. Outlet 92 is hydraulically coupled with exit flow area 82. Similarly, second flow-rate control path 100 includes inlet 94 and outlet 96. Inlet 94 is hydraulically coupled with the interior of emitter 70 via mesh arrangement 76 and inlet flow path 88, and outlet 96 is hydraulically coupled with exit flow area 84.

Such an emitter configuration is advantageous because it may allow an emitter with a flow-rate control path that has become plugged to still be used. In this respect, were emitter 70 employed in a leaching or irrigation system with orifice 74 formed corresponding to exit flow area 82, fluid would typically flow through flow-rate control path 98 to be conveyed externally to an emitter pipe. In this situation, were flow path 98 to become plugged, orifice 104 may then be formed corresponding to exit flow area 84. Fluid would then typically flow through flow-rate control path 100 to be conveyed externally to the emitter pipe. Therefore, even though one path may become plugged, the second path may be employed by simply drilling a second orifice in the emitter pipe, rather than having to cut the pipe and replace emitter 70. This dramatically reduces the cost of maintenance, repair or replacement due to plugging, thereby effectively doubling the life of the emitter system.

This two flow-rate control path system is particularly effective as a part of an emitter in which the flow-rate control paths are longer and/or take up a higher percentage of the surface area of the body of the emitter. Like emitter 42, emitter 70 may be said to have four even-sized quadrants. It can be seen that at least a portion of one of the two flow-control paths extends into each of the four quadrants. Another way to say this is that if the emitter has at least one flow-control path thereon, a flow control path extends into each of the four quadrants.

Third Embodiment of the Invention

Figure 13:
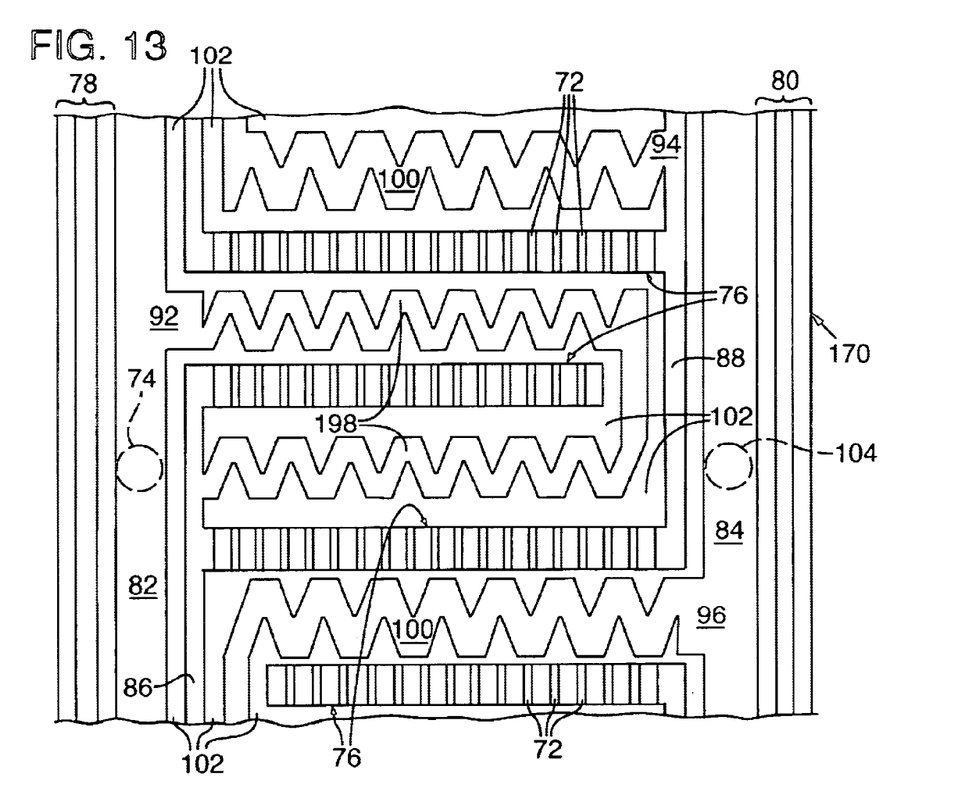
FIG. 13 is schematic, fragmentary, two dimensional representation of the surface configuration of a third embodiment of the present invention, this embodiment having two flow-rate control paths of differing width.

FIG. 13 depicts the surface configuration of an inline emitter 170 that corresponds to embodiment 70 of FIG. 12 except that the two flow-rate control paths are of different dimensions. Specifically, flow-rate control path 100 and all of the other components of emitter 170 are identical to those of emitter 70, with the exception of flow-rate control path 198. For this reason, all of these other components are identified with the same numerals as in FIG. 12. It can be seen that flow-rate control path 198 is narrower than flow-rate control path 100. This feature renders emitter 170 very versatile in that the flow of fluid through path 198 will be at a much slower or reduced rate when compared to path 100 or path 98 in FIG. 12. Therefore, when emitter 170 is initially installed in a fluid distribution pipe (not shown), either orifice 74 or 104 may be pierced. If orifice 74 is pierced, fluid will pass through flow-rate control path 198 and the flow-rate will be significantly less than if orifice 104 is pierced and flow-rate control path 100 is accessed. Of course, like emitter 70, if both orifices 74 and 104 are pierced, the flow-rate is greatest because fluid will be flowing through both paths. Or, if the first-pierced path becomes blocked, the second path is accessed without having to remove and replace the emitter.

Because it is visually difficult to distinguish an emitter with two flow-paths of different dimensions from one in which the two paths are identical, it may be desirable to color-code the emitters. Thus, an emitter with two identical flow paths might be red; one with a second flow path of ⅔ the flow-rate of the first flow path might be green; one with a second flow path of ½ the flow-rate of the first might be black; etc.

The disclosure set forth above may encompass multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A fluid flow emitter to be mounted entirely within a fluid distribution tube comprising:
a cylindrical body defining an axially extending inner region aligned with the tube in which the emitter is to be mounted, an outer surface including raised portions defining at least one flow-rate control path, at least some of the raised portions to be positioned against the inner diameter of the tube, with a plurality of holes interconnecting the inner region and the flow-rate control path, wherein the flow-rate control path is disposed between two annular sealing regions that form a fluid-tight seal when the emitter is disposed within an appropriately-sized fluid distribution tube, and wherein the flow-rate control path and the holes combine to cover at least 33 percent of the outer surface of the cylindrical body between the annular sealing regions, the flow-rate control path being hydraulically connected with an orifice in the fluid distribution tube to permit fluid to pass at a controlled rate from the tube, through the holes, along the flow-rate control path and out of the tube.

2. The emitter of claim 1 wherein the flow-rate control path is disposed over at least seventy percent of the circumference of the cylindrical body.

3. The emitter of claim 1 wherein flow-rate control path is disposed over at least ninety percent of the circumference of the cylindrical body.

4. The emitter of claim 1 wherein the flow-rate control path comprises a plurality of symmetrical, generally axially and generally circumferentially extending portions.

5. The emitter of claim 1, wherein the plurality of holes cover at least 4.5 percent of the outer surface of the cylindrical body between the annular sealing regions.

6. The emitter of claim 1 wherein the flow-rate control path includes a plurality of segments extending back and forth along the outer surface, with the holes being disposed between at least some of the back and forth segments.

7. The emitter of claim 1 wherein the flow-rate control path comprises a labyrinth path having a plurality of generally symmetrical back and forth segments and wherein the holes are disposed between at least some of the back and forth segments.

8. A fluid flow emitter to be mounted entirely within a fluid distribution tube comprising:
a cylindrical body having an inner surface defining an axially extending, open inner region to be aligned with the tube in which the emitter is to be mounted, and an outer surface including raised portions defining at least one flow-rate control path, at least some of the raised portions to be positioned against the inner diameter of the tube, with a plurality of holes interconnecting the inner region and the outer surface, wherein the flow-rate control path is disposed between two annular sealing regions that form a fluid-tight seal when the emitter is disposed within an appropriately-sized fluid distribution tube, and wherein the holes cover at least 4.5 percent of the outer surface of the cylindrical body between the annular sealing regions, the flow-rate control path being hydraulically connected with an orifice in the fluid distribution tube to permit fluid to pass at a controlled rate from the tube, through the holes, along the flow-rate control path and out of the tube.

9. The emitter of claim 8 wherein the flow-rate control path and the holes combine to cover at least 36 percent of the outer surface of the cylindrical body between the annular sealing regions.

10. The emitter of claim 8 wherein the plurality of holes are disposed in a plurality of arrays.

11. The emitter of claim 1 or 8 wherein the flow-rate control path extends in back and forth segments, with at least some of the plurality of holes disposed between at least some of the back and forth segments.

12. The emitter of claim 1 or 8 wherein the flow-rate control path is disposed between first and second exit flow areas, each of which is adjacent to one of the two annular sealing portions to form fluid-tight seals when the emitter is disposed within an appropriately sized fluid distribution tube.

13. A fluid flow emitter to be mounted entirely within a fluid distribution tube comprising:
a cylindrical body defining an axially extending inner region aligned with the tube in which the emitter is to be mounted, an outer surface including raised portions defining at least one flow-rate control path, the raised portions to be positioned against the inner diameter of the tube, with a plurality of holes hydraulically connecting the inner region to an inlet of the flow-rate control path, the flow-rate control path extending over at least 70 percent of the circumference of the outer surface of the cylindrical body, wherein an outlet of the flow-rate control path is hydraulically connected with at least one exit flow area, the exit flow area being defined by an annular sealing portion to form a fluid-tight seal when the emitter is disposed within an appropriately sized fluid distribution tube, and being hydraulically connected to an orifice in the fluid distribution tube to permit fluid to pass at a controlled rate from the tube, through the holes, along the flow-rate control path, into the exit flow area and out of the tube.

14. The fluid flow emitter of claim 13, further comprising a second exit flow area hydraulically connected with the flow-rate control path, the second exit flow area being defined by a second annular sealing portion to form a second fluid-tight seal when the emitter is disposed within an appropriately sized fluid distribution tube, the flow-rate control path extending between the two annular sealing portions, the second exit flow area being hydraulically connected to a second orifice in the fluid distribution tube.

15. The fluid flow emitter of claim 13 wherein the flow-rate control path includes generally symmetrical back and forth segments, and in which at least some of the holes are disposed between at least some of the segments.

16. The fluid flow emitter of claim 13 wherein the flow-rate control path covers at least 80 percent of the circumference of the outer surface of the emitter.

17. The fluid flow emitter of claim 13 wherein the flow-rate control path covers at least 90 percent of the circumference of the outer surface of the emitter.

18. The fluid flow emitter of claim 13 wherein the exit flow area is disposed at one distal end of the body.

19. The fluid flow emitter of claim 18, further comprising a second exit flow area hydraulically connected to the flow-rate control path outlet and positioned at a second distal end of the body remote from the one distal end, the exit flow area being defined by an annular sealing portion to form a fluid-tight seal when the emitter is disposed within an appropriately sized fluid distribution tube.

20. A fluid flow emitter to be mounted entirely within a fluid distribution tube comprising:

a cylindrical body defining an axially extending inner region aligned with the tube in which the emitter is to be mounted, an outer surface including raised portions defining at least one flow-rate control path, at least some of the raised portions to be positioned against the inner diameter of the tube, with a plurality of holes hydraulically connecting the inner region to an inlet of the flow-rate control path, the holes extending over at least 70 percent of the circumference of the outer surface of the emitter, wherein an outlet of the flow-rate control path is hydraulically connected with at least one exit flow area, the exit flow area being defined by an annular sealing portion to form a fluid-tight seal when the emitter is disposed within an appropriately sized fluid distribution tube, and being hydraulically connected to an orifice in the fluid distribution tube to permit fluid to pass at a controlled rate from the tube, through the holes, along the flow-rate control path, into the exit flow area and out of the tube.

21. The fluid flow emitter of claim 20 wherein the holes extend over at least 80 percent of the circumference of the outer surface of the cylindrical body.

22. The fluid flow emitter of claim 20 wherein the holes extend over at least 90 percent of the circumference of the outer surface of the cylindrical body.

23. The fluid flow emitter of claim 20 wherein the flow-rate control path extends over at least 70 percent of the circumference of the outer surface of the cylindrical body.

24. The fluid flow rate emitter of claim 20 wherein the flow-rate control and holes combine to cover at least 33 percent of the outer surface area of the cylindrical body.

25. The fluid flow emitter of claim 20 or 24 wherein the plurality of holes cover at least 4.5 percent of the outer surface of the cylindrical body.

26. A fluid flow emitter to be mounted entirely within a fluid distribution tube comprising:

a cylindrical body defining an axially extending inner region aligned with the tube in which the emitter is to be mounted, an outer surface including raised portions defining at least one flow-rate control path, at least some of the raised portions to be positioned against the inner diameter of the tube, with a plurality of holes hydraulically connecting the inner region to an inlet of the flow-rate control path, the holes and flow-rate control path combining to extend over at least 70 percent of the circumference of the outer surface of the emitter, wherein an outlet of the flow-rate control path is hydraulically connected with at least one exit flow area, the exit flow area being defined by a raised annular sealing portion to form a fluid-tight seal when the emitter is disposed within an appropriately sized fluid distribution tube, and being hydraulically connected to an orifice in the fluid distribution tube to permit fluid to pass at a controlled rate from the tube, through the holes, along the flow-rate control path, into the exit flow area and out of the tube.

27. The fluid flow emitter of claim 26 wherein the flow-rate control path includes portions that are adjacent other portions of the flow-rate control path and in which at least some of the plurality of holes are disposed between at least some of the adjacent portions of the flow-rate control path.

28. The fluid flow emitter of claim 26 wherein the holes and the flow-rate control path combine to extend over at least 80 percent of the circumference of the outer surface of the cylindrical body.

29. The fluid flow emitter of claim 26 wherein the holes and the flow-rate control path combine to extend over at least 90 percent of the circumference of the outer surface of the cylindrical body.

* * * * *